United States Patent
Sunkavally et al.

(10) Patent No.: US 11,122,438 B2
(45) Date of Patent: Sep. 14, 2021

(54) MAP-BASED TECHNIQUES FOR VISUALIZING USER ACCESS DATA AND FOR CONFIGURING AND ENFORCING LOCATION-BASED ACCESS POLICIES

(71) Applicant: EMC IP Holding Company LLC, Hopkinton, MA (US)

(72) Inventors: Naveen Sunkavally, Cary, NC (US); Leandro E. Diato, San Francisco, CA (US); Alex Zaslavsky, Brookline, MA (US); Victor Malchikov, Foster City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 16/402,541

(22) Filed: May 3, 2019

(65) Prior Publication Data
US 2020/0351655 A1  Nov. 5, 2020

(51) Int. Cl.
*H04W 12/63* (2021.01)
*G06F 16/29* (2019.01)
*G06F 21/30* (2013.01)

(52) U.S. Cl.
CPC ............ *H04W 12/63* (2021.01); *G06F 16/29* (2019.01); *G06F 21/30* (2013.01)

(58) Field of Classification Search
CPC ......... H04W 12/63; G06F 16/29; G06F 21/30
See application file for complete search history.

(56) References Cited

U.S. PATENT DOCUMENTS 10,810,235 B1 * 10/2020 Bakshi ................ G06F 12/0811
2012/0166229 A1 * 6/2012 Collins .................. G06Q 40/08
705/4

(Continued)

OTHER PUBLICATIONS

Fischer, Introduction to Alpha Shapes, (2004), https://n.ethz.ch/student/fischerk/alphashapes/as/.

(Continued)

*Primary Examiner* — Carl G Colin
*Assistant Examiner* — Andrew Suh
(74) *Attorney, Agent, or Firm* — Ryan, Mason & Lewisi, LLP

(57) ABSTRACT

Techniques are provided for visualizing user access data and for configuring and enforcing location-based access policies. One method comprises obtaining a plurality of risk-based policies specified by administrators using a map-based interface for multiple geographic regions, wherein the map-based interface comprises one or more zoom levels within each geographic region of the geographic regions, and wherein each geographic region has an associated aggregated risk score indicating a level of risk for user access events that occurred within the respective geographic region; and performing the following steps, in response to a user access event: determining a geolocation of the user access event; identifying a particular geographic region associated with the determined geolocation; identifying one or more of the plurality of risk-based policies associated with the particular geographic region; and processing the user access event based on the identified risk-based policies associated with the particular geographic region.

20 Claims, 8 Drawing Sheets

(56) References Cited

U.S. PATENT DOCUMENTS

| | | | | |
|---|---|---|---|---|
| 2012/0166347 A1* | 6/2012 | Lacal | .................... | G06Q 10/10 |
| | | | | 705/317 |
| 2013/0073581 A1* | 3/2013 | Sandholm | ........... | G06F 16/9537 |
| | | | | 707/769 |
| 2015/0261786 A1* | 9/2015 | Xu | .................... | G06F 16/2246 |
| | | | | 707/747 |
| 2016/0285888 A1* | 9/2016 | Arunkumar | ............. | H04L 67/02 |
| 2018/0300505 A1* | 10/2018 | Chakraborty | ....... | G06F 21/6254 |
| 2019/0259033 A1* | 8/2019 | Reddy | .................... | G06N 3/08 |

OTHER PUBLICATIONS

Duckham et al. Efficient Generation of Simple Polygons for Characterizing the Shape of a Set of Points in the Plane, preprint submitted to Elsevier, Jan. 11, 2008.

Wikipedia, GeoJSON, https://en.wikipedia.org/wiki/GeoJSON, 2019.

Ashwin, GitHub, GeoRaptor: Python Geohash Compression Tool, 2017, https://github.com/ashwin711/georaptor.

Bonsanto, GitHub, Polygon-Geohasher, 2019, https://github.com/Bonsanto/polygon-geohasher.

Pelletier, GitHub, Geohash-Poly, 2019, https://github.com/derrickpelletier/geohash-poly.

Wikipedia, Quickhull, Jan. 2019, https://en.wikipedia.org/wiki/Quickhull.

* cited by examiner

*FIG. 7*

AUTOMATED TOOL 700 FOR WHITELISTING AND BLACKLISTING SELECTED LOCATIONS

1) CREATE CIRCLE BY CLICKING ON POINT THAT BECOMES CENTER OF CIRCLE, AND MOVING MOUSE POINTER IN OR OUT TO ESTABLISH DESIRED CIRCLE SIZE

2) CREATE RECTANGULAR SHAPE BY CLICKING ON POINT THAT BECOMES TOP LEFT CORNER OF RECTANGLE, AND MOVING MOUSE POINTER DOWN AND RIGHT;

3) FREE DRAW SHAPE BY ALLOWING USER TO SUCCESSIVELY CLICK POINTS TO ESTABLISH LINE SEGMENTS MAKING UP CLOSED POLYGON;

4) FREE DRAW SHAPE BY ALLOWING USER TO DRAG MOUSE POINTER OVER REGION OF MAP;

5) CREATE FREE FORM SHAPE BY CLICKING ON SELECTED GEOHASH RECTANGLES;

6) CREATE SHAPE BY CLICKING POINT AND LETTING SYSTEM AUTOMATICALLY CREATE LOCATION BY SETTING SYMMETRIC SHAPE OF DEFAULT SIZE AROUND POINT ;

7) CREATE SHAPE BY CLICKING ON SPECIFIC ZIP CODE OR NEIGHBORHOOD;

8) CREATE RECTANGULAR SHAPE AS IN 2) BUT LET SYSTEM AUTOMATICALLY SUGGEST REASONABLE MINIMAL POLYGON COVERING POINTS (e.g., USER ACCESS EVENTS AT SPECIFIC GEOLOCATIONS) WITHIN CHOSEN RECTANGLE.

FIG. 8

GEOSHAPE CONVERSION PROCESS 800

1) START WITH MINIMUM GEOHASH PRECISION LEVEL, CALLED min_p;
2) SET MAXIMUM GEOHASH PRECISION LEVEL, max_p;
3) SET BEST_ERROR = INFINITY, BEST_REPRESENTATION = NULL;
4) for i = min_p to max_p:
   A. COMPUTE INNER, A GEOHASH REPRESENTATION WHERE SUBSTANTIALLY ALL GEOHASH RECTANGLES RESIDE WITHIN LOCATION SHAPE. ALL GEOHASH RECTANGLES ARE OF PRECISION i.
   B. COMPUTE OUTER, A GEOHASH REPRESENTATION FOR WHICH GEOHASH RECTANGLES ARE ALLOWED TO GO BEYOND BOUNDARY OF LOCATION SHAPE. ALL GEOHASH RECTANGLES ARE OF PRECISION i.
   C. COMPUTE APPROXIMATION ERROR FOR INNER AND OUTER. APPROXIMATION ERROR IS DIFFERENCE IN AREA BETWEEN LOCATION'S ACTUAL SHAPE AND REPRESENTATION.
   D. COMPARE ERROR OF INNER AND OUTER AND CHOOSE ONE WITH LOWER ERROR. THEN, TAKE ERROR AND COMPARE TO BEST_ERROR. IF LOWER THAN BEST_ERROR, SET BEST_ERROR TO NEW LOWEST ERROR AND SET BEST_REPRESENTATION TO EITHER INNER OR OUTER.
5) COMPRESS BEST_REPRESENTATION.

FIG. 9
POLICY RULE DATABASE 900
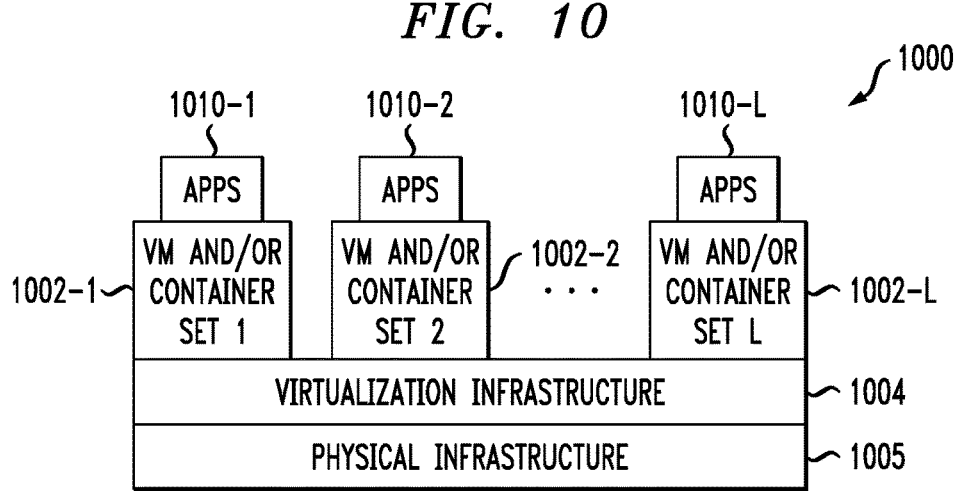
FIG. 10
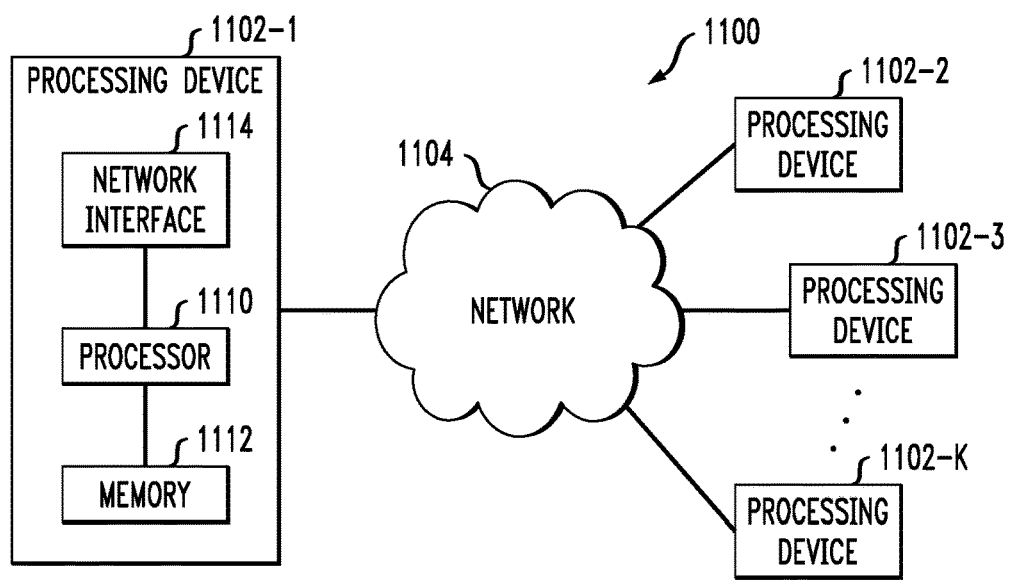
FIG. 11

MAP-BASED TECHNIQUES FOR VISUALIZING USER ACCESS DATA AND FOR CONFIGURING AND ENFORCING LOCATION-BASED ACCESS POLICIES

FIELD

The field relates generally to risk-based authorization and authentication.

BACKGROUND

Traditional authentication methods are typically based on successful validation of user credentials, such as usernames and passwords. Risk-based authorization and authentication extend such traditional authentication methods by also considering metadata about an access attempt by a user and a corresponding risk score associated with the metadata. The metadata related to a given access attempt by a user can include, for example, a device identifier, a geolocation identifier, Active Directory group information, an Internet Protocol (IP) subnet identifier, and an identifier of the particular application that the user is attempting to access.

A risk-based approach allows an administrator to make trade-offs between security concerns and user convenience. For example, a security policy may dictate that users accessing a highly sensitive application will always experience a step-up authentication (e.g., a given user must present a secondary authentication factor). A different policy, however, may allow users accessing a non-sensitive application from a geolocation corresponding to an approved corporate facility to not have to experience a step-up authentication.

A need exists for improved techniques for providing risk-based policies based on geolocation data of the user. A further need exists for map-based techniques for visualizing user access attempts and the associated risk and for configuring and enforcing location-aware access policies.

SUMMARY

In one embodiment, a method comprises obtaining a plurality of risk-based policies specified by one or more administrators using a map-based interface for a plurality of geographic regions, wherein the map-based interface comprises one or more zoom levels within each geographic region of the plurality of geographic regions, and wherein each of the geographic regions has an associated aggregated risk score indicating a level of risk for user access events that occurred within the respective geographic region; and performing the following steps, in response to a user access event: determining a geolocation of the user access event; identifying a particular geographic region associated with the determined geolocation; identifying one or more of the plurality of risk-based policies associated with the particular geographic region; and processing the user access event based on the identified one or more risk-based policies associated with the particular geographic region.

In some embodiments, the identified one or more risk-based policies associated with the particular geographic region specify one or more of: allow the user access event, deny the user access event and require an additional step-up authentication. The one or more administrators optionally employ the map-based interface to define the one or more risk-based policies, define one or more alarms for a violation of the one or more risk-based policies and/or define one or more remediation actions for the violation of the one or more risk-based policies.

In at least one embodiment the map-based interface further comprises a visualization tool to visualize user access data for a plurality of the user access events and the corresponding risk score for each user access event.

Other illustrative embodiments include, without limitation, apparatus, systems, methods and computer program products comprising processor-readable storage media.

BRIEF DESCRIPTION OF THE DRAWINGS

FIG. 7 illustrates exemplary pseudo code for an automated tool for selectively whitelisting and blacklisting selected locations, according to an embodiment of the disclosure;

FIG. 8 illustrates exemplary pseudo code for a geoshape conversion process, according to some embodiments of the disclosure;

FIG. 9 illustrates an exemplary policy rule database, according to at least one embodiment;

FIG. 10 illustrates an exemplary processing platform that may be used to implement at least a portion of one or more embodiments of the disclosure comprising a cloud infrastructure; and FIG. 11 illustrates another exemplary processing platform that may be used to implement at least a portion of one or more embodiments of the disclosure.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide map-based methods, apparatus and computer program products for visualizing user access data and for configuring and enforcing location-based access policies.

Figure 1:
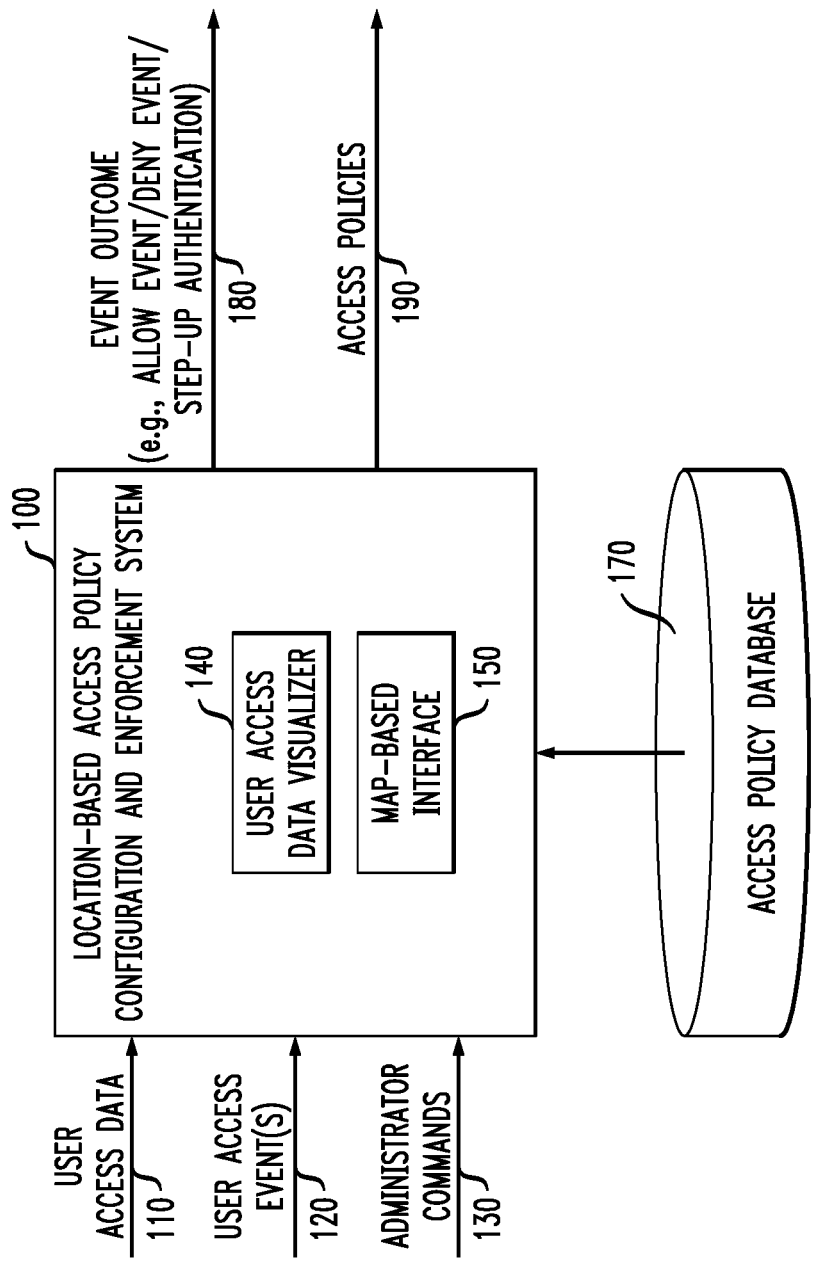
FIG. 1 illustrates a location-based access policy configuration and enforcement system, according to one or more embodiments of the disclosure.

In one or more embodiments, map-based techniques are provided for visualizing user access data and for configuring and enforcing location-based access policies. FIG. 1 illustrates a location-based access policy configuration and enforcement system 100, according to one or more embodiments of the disclosure. As shown in FIG. 1, the exemplary location-based access policy configuration and enforcement system 100 processes user access data 110, one or more user access event(s) 120, and/or administrator commands 130, to generate an event outcome 180 (e.g., allow event/deny event/step-up authentication). The user access data 110, and the one or more user access event(s) 120 are discussed further below in conjunction with FIG. 5. The administrator commands 130 comprise, for example, any user interface interactions from an administrator to configure and/or enforce a user access policy.

The exemplary location-based access policy configuration and enforcement system 100 comprises a user access data visualizer 140 and a map-based interface 150, each discussed further below. The exemplary location-based access policy configuration and enforcement system 100 generates and employs an access policy database 170 that stores one or more access policies generated, for example, by the location-based access policy configuration and enforcement system 100.

While the exemplary embodiment of FIG. 1 illustrates the location-based access policy configuration and enforcement system 100 as comprising the functionality for both configuring and enforcing user access policies 190, these functions can be split across multiple devices and/or across multiple modules within the location-based access policy configuration and enforcement system 100. For example, the enforcement of the user access policies 190 can optionally be implemented using an intrusion detection system (IDS) or another access control and/or authentication system.

Figure 2:
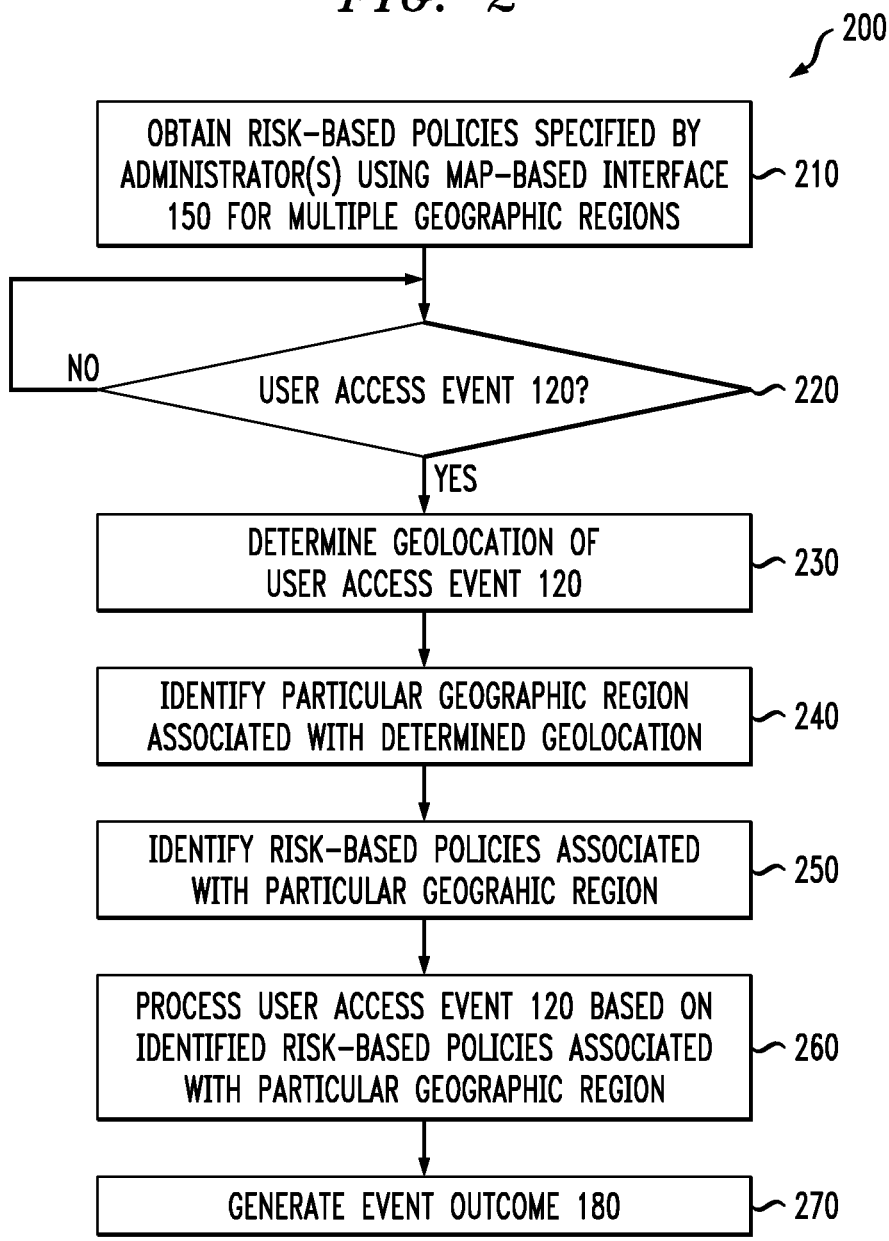
FIG. 2 is a flow chart illustrating an exemplary implementation of a location-based access policy configuration and enforcement process, according to some embodiments.

FIG. 2 is a flow chart illustrating an exemplary implementation of a location-based access policy configuration and enforcement process 200, according to some embodiments. As shown in FIG. 2 during step 210, the exemplary location-based access policy configuration and enforcement process 200 obtains one or more risk-based policies specified by administrator(s) using a map-based interface 150 for multiple geographic regions, as discussed further below in conjunction with FIG. 3. In some embodiments, the map-based interface 150 comprises one or more zoom levels within each geographic region of the plurality of geographic regions, and wherein each of the geographic regions has an associated aggregated risk score indicating a level of risk for a plurality of user access events 120 that occurred within the respective geographic region.

A test is performed during step 220 to determine if a user access event is detected. Once it is determined during step 220 that a user access event is detected, the exemplary location-based access policy configuration and enforcement process 200 determines a geolocation associated with the user access event during step 230.

In addition, a particular geographic region associated with the determined geolocation is identified during step 240 and one or more risk-based policies associated with the particular geographic region is identified during step 250.

The exemplary location-based access policy configuration and enforcement process 200 processes the user access event during step 260 based on the identified risk-based policies associated with the particular geographic region. Finally, an event outcome 180 is generated during step 270.

The particular processing operations and other network functionality described in conjunction with the flow diagram of FIG. 2 are presented by way of illustrative example only, and should not be construed as limiting the scope of the disclosure in any way. Alternative embodiments can use other types of processing operations to configure and/or enforce user access policies 190 using the map-based interface 150. For example, the ordering of the process steps may be varied in other embodiments, or certain steps may be performed concurrently with one another rather than serially.

In addition, while the exemplary embodiment of FIG. 2 illustrates the location-based access policy configuration and enforcement process 200 as comprising the functionality for both configuring and enforcing user access policies 190, these functions can be split across multiple processes on multiple devices and/or across multiple processes within the location-based access policy configuration and enforcement system 100 of FIG. 1. For example, the enforcement of the user access policies 190 can optionally be implemented using an intrusion detection system (IDS) or another access control and/or authentication system.

Figure 3:
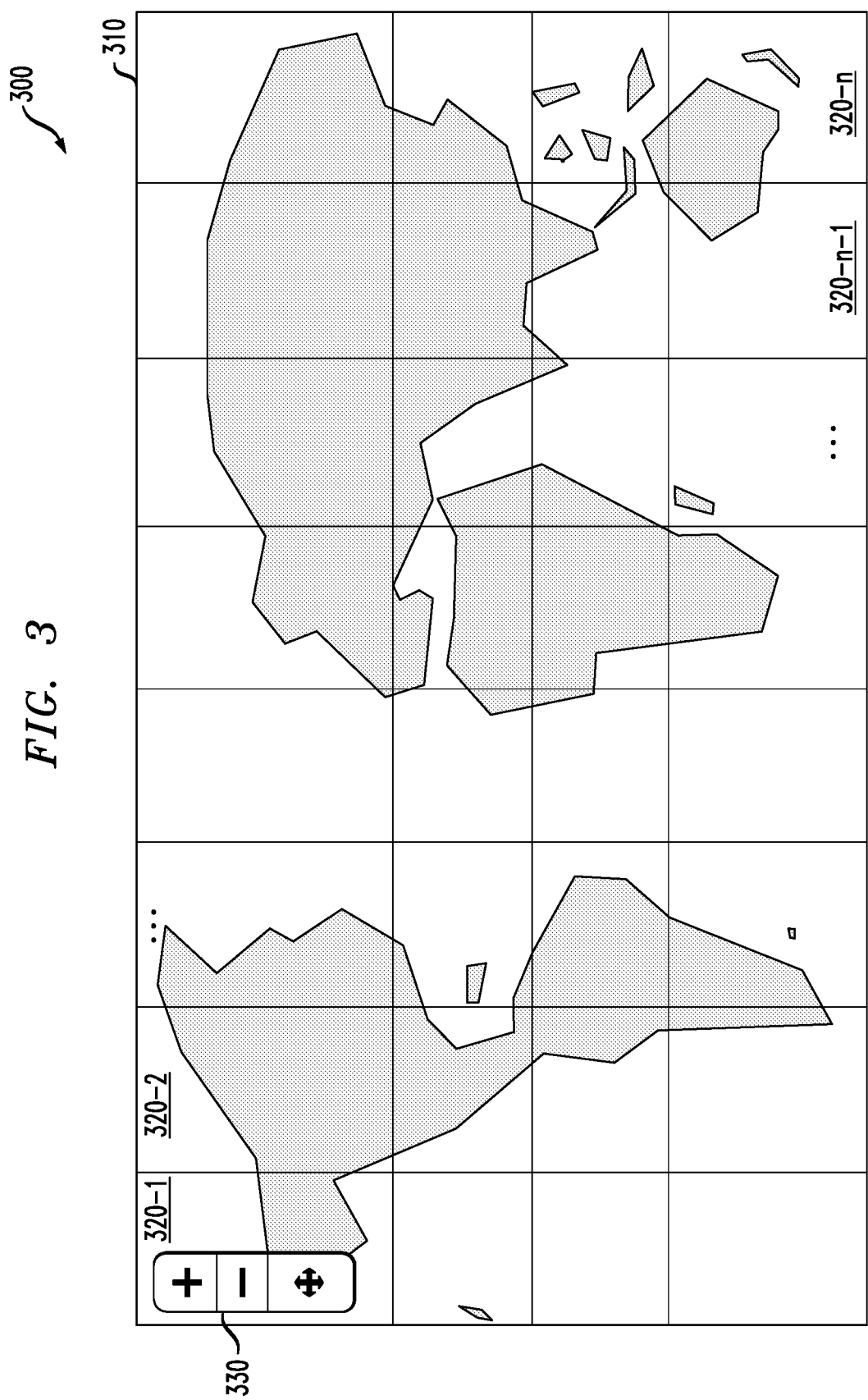
FIG. 3 illustrates an exemplary world map interface, in accordance with an exemplary geohashing embodiment.

Geohashing encodes a geolocation, often expressed as a latitude and longitude, as a character string. The geohash encoding allows efficient operations, such as evaluating a distance between two points, or determining if a given point resides within a given region on a map. FIG. 3 illustrates an exemplary world map interface 300 divided into a rectangular grid 310, comprising, for example, a plurality of rectangles 320-1 through 320-$n$, in accordance with one exemplary geohashing technique. In the example of FIG. 3, there are 32 rectangles 320 (e.g., a 4×8 array of rectangles 320), and a given rectangle 320 can be further divided into another rectangular sub-grid (not shown in FIG. 3) comprising, for example, 32 more rectangles, and so on, up to 32 levels deep in some embodiments. In this manner, the exemplary world map interface 300 optionally supports multiple zoom levels that allows users to focus on specific portions of the world. Each zoom level is tied to a corresponding geohash precision level. The lower the zoom level, then the more of the world that can be seen, and the lower the geohash precision associated with that zoom level.

In at least one embodiment, base-32 labels are assigned at each level to the rectangles 320. Generally, the longer that a geohash string is, the more precise the geohash string becomes in describing the exact location of a point. At the highest level of precision, the accuracy of a geohash can be expressed, for example, in terms of millimeters.

As shown in FIG. 3, the exemplary world map interface 300 optionally further comprises a set of zoom and pan controls 330, in a known manner. The exemplary world map interface 300 can be hosted, for example, by a web site, a desktop device, or a mobile application, targeted to an administrative user.

In some embodiments, the geohash precision associated with the current zoom level of the exemplary world map interface 300 allows clusters of user access locations to be retrieved and shown as points on the map, and metrics can be aggregated for the geohash rectangles 320 corresponding to that level of precision. The metrics that can be aggregated per geohash rectangle, in some embodiments, include, for example, an aggregated risk score, computed across all user access events that fall within the geohash rectangle. The aggregated risk score of a given geohash rectangle is optionally used to color-code the corresponding geohash rectangle. For example, a geohash rectangle associated with a high-risk region may be color-coded as a "red" rectangle, while a low-risk region may be color-coded as a "green" rectangle, as would be apparent to a person of ordinary skill in the art. One or more aspects of the disclosure recognize that color-coding geohash rectangles by their aggregated risk score allows an administrator to quickly identify those regions that may be the most interesting to explore further.

In a further variation, additional metrics gathered for each geohash rectangle 320 optionally become visible to the administrator when the administrator points a user interface device, such as a mouse, over a particular geohash rectangle 320. These metrics, for example, can include contextual information, such as a breakdown of user access attempts across IP subnets or user Active Directory groups for that specific geohash rectangle 320.

To check whether a particular point belongs to a given region, the geohash string of the point is compared to the geohashes comprising the region, and if one of the geohashes of the region matches the prefix of the geohash of the point, then the point is deemed to be part of the region. A prefix tree can optionally be used to speed up comparison, if a region comprises many geohashes. For a further discussion of geohashing techniques, see, for example, the Wikipedia page on geohash, incorporated by reference herein in its entirety.

Figure 4:
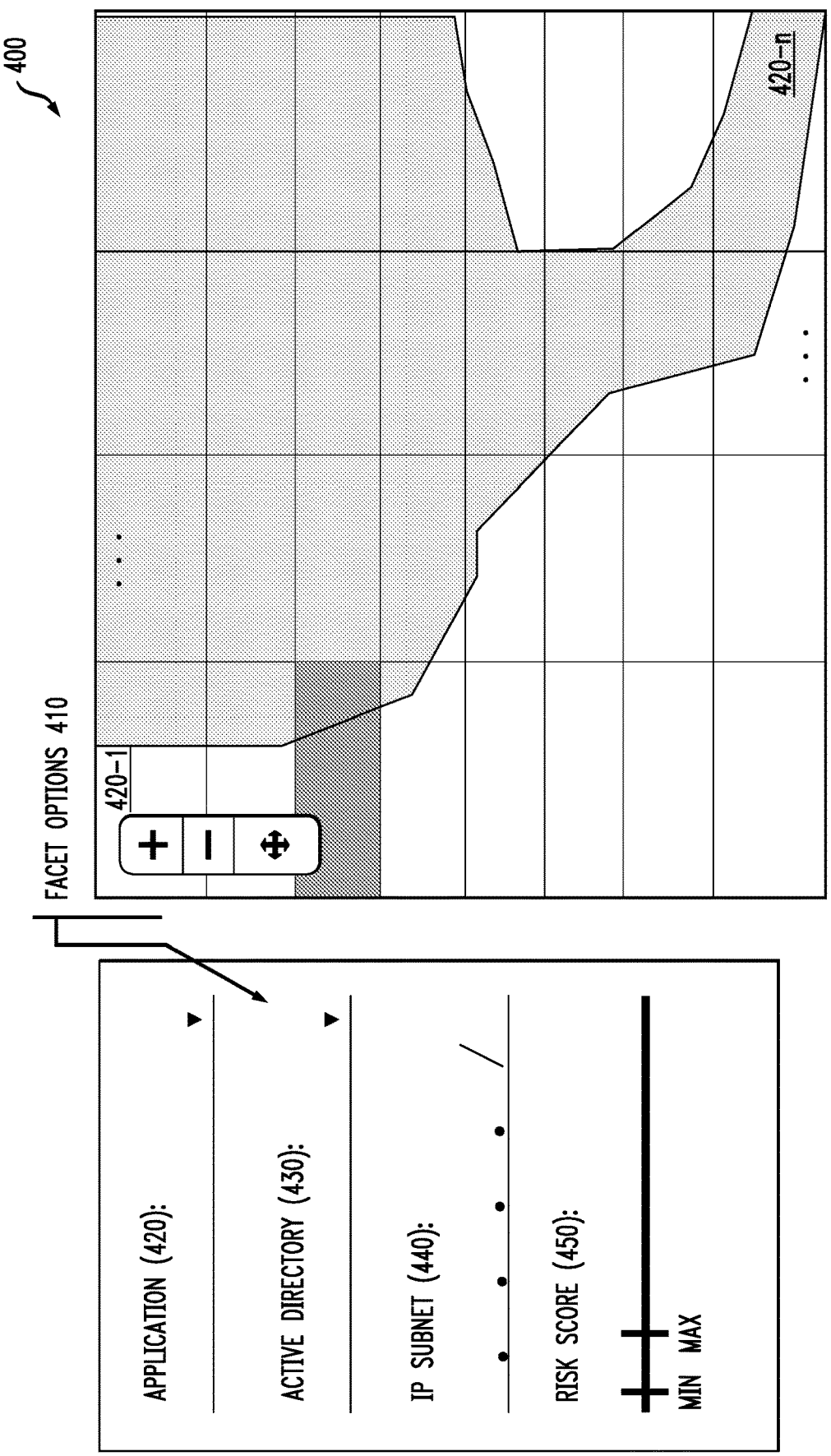
FIG. 4 illustrates an exemplary world map interface comprising a number of exemplary facet options 410, according to at least one embodiment of the disclosure.

FIG. 4 illustrates an exemplary world map interface 400 comprising a number of exemplary facet options 410, according to at least one embodiment of the disclosure. Generally, the exemplary facet options 410 optionally act as filters on the map (e.g., the world map interface 400 can be configured to only show low-risk events). In at least one embodiment, the exemplary world map interface 400 optionally supports filtering the data set against which user access events 120 are aggregated to compute the different available metrics for each geohash rectangle 420-1 through 420-n. For example, these facet filters 410 can be implemented using a faceted search style interface, such as those often employed by shopping applications, such as Amazon.com when browsing for products to purchase. In the context of the present disclosure, relevant facet filters 410 include, but are not limited to, the application 420 the user is trying access, Active Directory groups 430 that users may be a part of, IP subnets 440 users may be accessing applications from, or a risk score threshold 450 (e.g., only show geohash rectangles whose aggregated risk score is above or below a certain threshold), as shown in FIG. 4. Panning or zooming in on the map also acts as an implicit filter that bounds the region in which user access events are aggregated.

While geohashing is used in one or more exemplary embodiments to implement the functionality described herein, other known techniques for encoding a geolocation can be employed, as would be apparent to a person of ordinary skill in the art, and the scope of this disclosure is not limited to the use of geohashing. There are several existing database and spatial indexing technologies that can be employed with geohashes and allow for efficient queries and aggregations based on geohashes, in a known manner. These technologies include, for example, Postgres, Elasticsearch, Solr, and Lucene.

Figure 5:
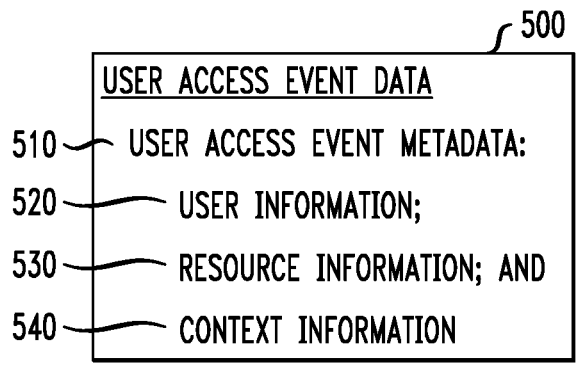
FIG. 5 is a sample table illustrating exemplary user access data associated with user access events, according to an embodiment.

FIG. 5 is a sample table 500 illustrating exemplary user access data 110 associated with user access events 120. Generally, the user access data 110 is comprised of historical user access events 120, as well as user access events 120 processed by the location-based access policy configuration and enforcement system 100 in real-time to determine an event outcome 180. Each user access event 120 represents an attempt by a user to access a resource. As shown in FIG. 5, each user access event 120 comprises user access event metadata 510 about the user access attempt 120. The exemplary user access event metadata 510 comprises user information 520 about the user attempting the access, resource information 530 about the resource being accessed, and other context information 540 related to the access attempt.

In some embodiments, the user access metadata 510 comprises the following representative event attribute information:

User Geolocation: represented, for example, as a latitude or longitude and, optionally, also an equivalent geohash encoded string (a geolocation of a user can be obtained in a number of ways, such as from a web browser using HTML5, or by performing a GeoIP lookup against the IP address of the user); and Risk Score: a metric that captures the risk level of a given user access event 120 (the risk score is computed, for example, based on the exemplary user access event metadata 510 and generally considers a likelihood of a risk being realized (in this case, a malicious user obtaining access to a resource) and the impact of the risk being realized (in this case, exploitation of the resource).

In some embodiments of the disclosure, it is assumed that the risk score is a real number between 0 and 1, and the lower the score, the lower the risk. There are many strategies available for creating a risk metric, and the definition of risk can change from enterprise to enterprise, as would be apparent to a person of ordinary skill in the art.

Figure 6:
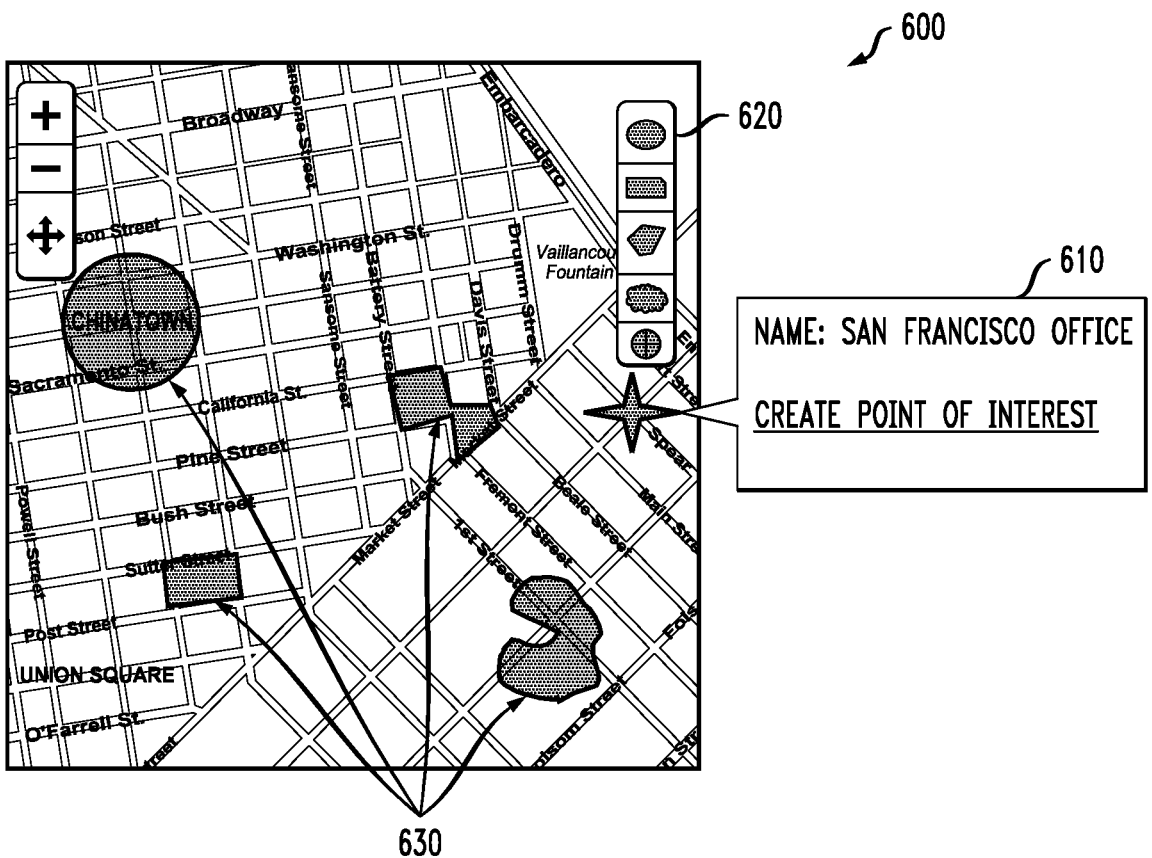
FIG. 6 illustrates an exemplary world map interface for creating points of interests with custom shapes, in accordance with one exemplary embodiment of the disclosure.

FIG. 6 illustrates an exemplary world map interface 600 for creating points of interests with custom shapes, in accordance with one exemplary embodiment of the disclosure. Generally, the exemplary world map interface 600 allows a user to establish and visualize pins marking "points of interest" to the customer, such as an enterprise organization, according to some embodiments. For example, as shown in FIG. 6, the exemplary world map interface 600 may present a contextual action dialog box 610 that allows a user to create and save a point of interest in the position where the user was pointing, for example, with a user interface device, at the time the contextual dialog box 610 was activated.

In addition, the exemplary world map interface 600 optionally provides one or more shape tools 620 that allow a user to specify and create points of interest 630 having a user-specified shape. In one exemplary implementation, the shape tools 620 further comprise a shape tool that allows a user to select an automatic creation option where the disclosed system will automatically create the point of interest 630 using a predefined or selected shape (e.g., a circular or rectangular shape).

In an enterprise context, for example, these points of interest 630 may correspond to the locations of facilities that belong to the customer. Exemplary points of interest 630 can optionally include temporary locations, such as a conference site with a high concentration of company employees. These points of interest 630 can be explicitly configured by the customer or retrieved from an external configuration source, such as Active Directory. Displaying these points of interest 630 helps administrators to reason about user access events close to the points of interest, and to make informed policy decisions.

Clicking or "right-clicking" on any point on the map can open a menu or dialog box that provides an option to set that point as a point of interest 630 and to save additional information about the point of interest 630, such as a user-friendly name, using well-known graphical user interface techniques, for example.

Whitelisting and Blacklisting Locations

After examining the user access data 110 using the map-based interface 150, an administrator may choose to update one or more user access policies, for example, in the access policy database 170 by whitelisting or blacklisting locations (to selectively allow or deny access at these locations, respectively). Locations in this context are not pin points but regions of arbitrary shape such as circles, rectangles, or polygons.

There are a number of ways that a map widget could allow administrators to whitelist or blacklist a given location. One possible way to whitelist or blacklist a given location would be to allow an administrator to first select a menu option to whitelist or blacklist the given location.

FIG. 7 illustrates exemplary pseudo code for an automated tool 700 for selectively whitelisting and blacklisting selected locations, according to an embodiment of the disclosure. As shown in FIG. 7, after an administrator selects a menu option to whitelist or blacklist the given location, and depending on what types of location shapes are supported, the map could allow administrators to:

1) Create a circle by clicking on point that becomes center of circle, and moving a mouse pointer in or out to establish desired circle size;

2) Create a rectangular shape by clicking on point that becomes the top left corner of rectangle, and moving the mouse pointer down and right (in a similar manner as a cropping tool in a photo editing application);

3) Free draw shape by allowing a user to successively click points to establish line segments making up closed polygon;

4) Free draw shape by allowing the user to drag mouse pointer over region of map;

5) Create free form shape by clicking on selected geohash rectangles;

6) Create shape by clicking point and letting system 100 automatically create location by setting symmetric shape (e.g., a circle shape) of default size around point;

7) Create shape by clicking on specific zip code or neighborhood;

8) Create rectangular shape as in 2) but let system 100 automatically suggest reasonable minimal polygon covering points (e.g., user access events at specific geolocations) within chosen rectangle (generally, rectangular shape chosen by the administrator does not have to be very precise).

a. In the case of a whitelisted location, the system 100 will only consider points where the user risk is below a specified level; in the case of a blacklisted location, the system 100 will only consider points above a specified level.

b. There are well known algorithms to construct shapes covering a set of points. These algorithms include Quickhull (see, e.g., corresponding Wikipedia page, incorporated by reference herein in its entirety) to create a convex polygon, or Edelsbrunner's algorithm (see, e.g., Kaspar Fischer, "Introduction to Alpha Shapes," (2019), incorporated by reference herein in its entirety, and Matt Duckham et al., "Efficient Generation of Simple Polygons for Characterizing the Shape of a Set of Points in the Plane," Pattern Recognition, Vol. 41, No. 10, 3224-36 (October 2008), incorporated by reference herein in its entirety), to create non-convex polygons, which are more compact than convex polygons.

Once a location shape is chosen or generated by the location-based access policy configuration and enforcement system 100, it is converted in some embodiments to a representation comprising geohash rectangles of varying precision. Since a location could have an arbitrary shape, including curves, it may not be possible to exactly represent a location in terms of geohash rectangles. However, it is possible to obtain a good and sufficient approximation by allowing for geohash rectangles of different precision levels.

FIG. 8 illustrates exemplary pseudo code for a geoshape conversion process 800, according to some embodiments of the disclosure. As shown in FIG. 8, a shape is converted into a representation comprising geohash rectangles, as follows:

1) Start with a minimum geohash precision level, called min_p. This could be for instance the same as the precision corresponding to the user's current map zoom level;

2) Set a maximum geohash precision level, max_p. This could be, for instance n+min_p, where n is a fixed constant;

3) Set best_error=infinity, best_representation=null;

4) for i=min_p to max_p:

a. Compute inner, a geohash representation where all geohash rectangles must reside strictly within the location shape. All geohash rectangles are of precision i.

b. Compute outer, a geohash representation for which all geohash rectangles are allowed to go beyond the boundary of the location shape. All geohash rectangles are of precision i.

c. Compute the approximation error for inner and outer. The approximation error is the difference in area between the location's actual shape and its representation.

d. Compare the error of inner and outer and choose the one with the lower error. Then take that error and compare it to best_error. If it's lower than best_error, set best_error to the new lowest error and set best_representation to either inner or outer (depending on which one had the lower error).

5) Compress best_representation. This takes the geohash representation and tries to collapse adjacent geohash rectangles to be of a lower precision level if possible. This is desirable as having less geohash rectangles improves overall performance. Compression does not increase the error of the original representation. Conceptually, this is similar to constructing a prefix tree with the geohash strings that make up the location, and then collapsing leaf nodes, starting from the bottom going up, if all the leaf nodes in a subtree are present.

Steps 3 and 4 can be accomplished, for example, using a tool, such as a github tool to "Transform a geoJSON MultiPolygon or Polygon into a list of geohashes that form it" (downloadable from https://github.com/derrickpelletier/geohash-poly) and/or a github tool to "Converts a polygon into a set of geohashes with arbitrary precision" (downloadable from https://github.com/Bonsanto/polygon-geohasher). Step 5 can be accomplished, for example, using the github tool to "Python Geohash Compression Tool" (downloadable from https://github.com/ashwin711/georaptor). Tools like Postgres, Elasticsearch, Solr, and Lucene can also automate some of these steps as well, using input shapes specified in GeoJSON format (see, for example, corresponding Wikipedia page, incorporated by reference herein in its entirety).

After the conversion is complete, the whitelisted or blacklisted shape is saved as a collection of geohash rectangles, or equivalently as a prefix tree of geohash strings.

The location, in combination with the administrator's active filters, can be used to automatically create a policy rule (e.g., if application=X and location=Y and the risk score <Z, then allow access). An intermediate dialog may show the policy change to be made and allow the administrator to confirm the policy update or make further changes prior to making the update.

Whitelisted and blacklisted locations can be shown on the map-based interface 150. As with other geohash rectangles, metrics are aggregated per location, and locations can be color-coded based on its aggregated risk score. An administrator can point to a particular location to obtain additional metrics.

Policy Enforcement

FIG. 9 illustrates an exemplary policy rule database 900, according to at least one embodiment. The exemplary policy rule database 900 comprises one exemplary policy 910 indicating that if an application=X and location=Y and the risk score <Z, then allow access.

At the time a user is accessing a resource, with a user access event 120, his or her location must be compared against whitelisted and blacklisted locations that are part of the resource's policy, such as policy 910. This comparison is straightforward and efficient since a whitelisted or blacklisted location is nothing more than a collection of geohash rectangles, as described above. The user's geolocation can be converted in real-time to a geohash an encoded string. If any of the geohash rectangles that make up a location prefix-match the user's geohash string, then the user is deemed to be coming from that location, and the appropriate policy action can be taken. A prefix tree can be used to improve performance if a location consists of many geohashes.

Many variations of the above map-based techniques for visualizing user access data and for configuring and enforcing location-based access policies are possible. The user interface can be designed in many different ways and yet accomplish the same functionality above. In addition, geohashing does not necessarily need to be used to accomplish the above goals, such as checking if a user's geolocation is part of as specific region. In addition, there are other methods available for encoding points into locations and decomposing location shapes. In addition, the solution could be set up to support multiple tenants or a single tenant, and hosted on-premises or in the cloud.

The disclosed map-based techniques for visualizing user access data and for configuring and enforcing location-based access policies allow policy administrators to configure whitelisted locations using a single map-based interface 150 through which administrators can simultaneously visualize user access data and risk on a map, configure points of interest, and whitelist and blacklist locations. A unified map-based interface 150 is important, as a conventional interface that disconnects the visualization of user access data from policy configuration inhibits policy changes.

Among other benefits, the disclosed map-based techniques for visualizing user access data and for configuring and enforcing location-based access policies allows for locations to be expressed as any arbitrary shape, whether it is a circle, rectangle, or polygon, and these locations can be entirely specified by an administrator or generated by the system with minimal input from the administrator. In this manner, administrators can precisely define locations that should be whitelisted or blacklisted. In addition, customers (e.g., enterprise customers) can monitor, optionally in real-time, the behavioral/business changes in their environment and quickly respond to them, such as the opening of a new office or the start of a long-term project.

One or more embodiments of the disclosure provide improved map-based methods, apparatus and computer program products for visualizing user access data and for configuring and enforcing location-based access policies. The foregoing applications and associated embodiments should be considered as illustrative only, and numerous other embodiments can be configured using the techniques disclosed herein, in a wide variety of different applications.

It should also be understood that the disclosed location-based access policy configuration and enforcement techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for visualizing user access data and for configuring and enforcing location-based access policies may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based location-based access policy configuration and enforcement engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based location-based access policy configuration and enforcement platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

FIG. 10 shows an example processing platform comprising cloud infrastructure 1000. The cloud infrastructure 1000 comprises a combination of physical and virtual processing resources that may be utilized to implement at least a portion of the information processing system. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide location-based access policy configuration and enforcement functionality of the type described above for one or more processes running on a given one of the VMs. For example, each of the VMs can implement location-based access policy configuration and enforcement control logic and associated user access policies 190 for providing map-based configuration and enforcement of location-based access policies for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide location-based access policy configuration and enforcement functionality of the type described above for one or more processes running on different ones of the containers. For example, a container host device supporting multiple containers of one or more container sets can implement one or more instances of location-based access policy configuration and enforcement control logic and associated user access policies 190 for providing map-based configuration and enforcement of location-based access policies.

As is apparent from the above, one or more of the processing modules or other components of location-based access policy configuration and enforcement system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of risk-based policies specified by one or more administrators using a map-based interface for a plurality of geographic regions, wherein the map-based interface comprises one or more zoom levels within each geographic region of the plurality of geographic regions and an indication of an associated aggregated risk score for each of the plurality of geographic regions indicating a level of risk for a plurality of user access events that occurred within the respective geographic region, wherein each of the plurality of user access events comprises a given user attempting to gain access to one or more computer-related resources and is associated with a geohash-encoded string corresponding to the respective geographic region; and
in response to a further user access event:
determining a geolocation of the further user access event;
converting the geolocation of the user access event to a geohash-encoded string;
identifying a particular geographic region associated with the determined geolocation by matching the geohash-encoded string of the further user access event to geohash-encoded strings of the plurality of geographic regions;
identifying one or more of the plurality of risk-based policies associated with the particular geographic region; and
processing the user access event based on the identified one or more risk-based policies associated with the particular geographic region,
wherein the method is performed by at least one processing device comprising a processor coupled to a memory.

2. The method of claim 1, wherein the identified one or more risk-based policies associated with the particular geographic region specify one or more of: allow the further user access event, deny the further user access event and require an additional step-up authentication.

3. The method of claim 2, wherein the one or more administrators employ the map-based interface to one or more of define the one or more risk-based policies, define one or more alarms for a violation of the one or more risk-based policies and define one or more remediation actions for the violation of the one or more risk-based policies.

4. The method of claim 1, wherein said matching comprises using a prefix-matching technique.

5. The method of claim 1, wherein the map-based interface further comprises a visualization tool to visualize user access data for a plurality of the user access events and the corresponding risk score for each user access event.

6. The method of claim 1, wherein at least one of the geographic regions corresponds to a point of interest of an enterprise organization, and wherein the map-based interface further comprises a tool for configuring the point of interest of the enterprise organization.

7. The method of claim 6, wherein the map-based interface further comprises a tool for specifying the point of interest of the enterprise organization with an arbitrary shape.

8. The method of claim 1, wherein the map-based interface further comprises a tool for filtering access data of the plurality of user access events that are included in the computation of the aggregated risk score for one or more of the geographic regions.

9. The method of claim 1, wherein the one or more computer-related resources comprises an application, and wherein each of the plurality of user access events is further associated with at least one of: a device identifier of the user, a sub-network identifier, and an identifier of the application.

10. A computer program product, comprising a non-transitory machine-readable storage medium having encoded therein executable code of one or more software programs, wherein the one or more software programs when executed by at least one processing device perform the following steps:
obtaining a plurality of risk-based policies specified by one or more administrators using a map-based interface for a plurality of geographic regions, wherein the map-based interface comprises one or more zoom levels within each geographic region of the plurality of geographic regions and an indication of an associated aggregated risk score for each of the plurality of geographic regions indicating a level of risk for a plurality of user access events that occurred within the respective geographic region, wherein each of the plurality of user access events comprises a given user attempting to gain access to one or more computer-related resources and is associated with a geohash-encoded string corresponding to the respective geographic region; and
in response to a further user access event:
determining a geolocation of the further user access event;
converting the geolocation of the user access event to a geohash-encoded string;
identifying a particular geographic region associated with the determined geolocation by matching the geohash-encoded string of the further user access event to geohash-encoded strings of the plurality of geographic regions;

identifying one or more of the plurality of risk-based policies associated with the particular geographic region; and processing the user access event based on the identified one or more risk-based policies associated with the particular geographic region.

11. The computer program product of claim 10, wherein the one or more administrators employ the map-based interface to one or more of define the one or more risk-based policies, define one or more alarms for a violation of the one or more risk-based policies and define one or more remediation actions for the violation of the one or more risk-based policies.

12. The computer program product of claim 10, wherein said matching comprises using a prefix-matching technique.

13. The computer program product of claim 10, wherein the map-based interface further comprises at least one of:
 a visualization tool to visualize user access data for a plurality of the user access events and the corresponding risk score for each user access event; and
 a tool for filtering access data of the plurality of user access events that are included in the computation of the aggregated risk score for one or more of the geographic regions.

14. The computer program product of claim 10, wherein at least one of the geographic regions corresponds to a point of interest of an enterprise organization, and wherein the map-based interface further comprises a tool for configuring the point of interest of the enterprise organization.

15. An apparatus, comprising:
 a memory; and
 at least one processing device, coupled to the memory, operative to implement the following steps:
 obtaining a plurality of risk-based policies specified by one or more administrators using a map-based interface for a plurality of geographic regions, wherein the map-based interface comprises one or more zoom levels within each geographic region of the plurality of geographic regions and an indication of an associated aggregated risk score for each of the plurality of geographic regions indicating a level of risk for a plurality of user access events that occurred within the respective geographic region, wherein each of the plurality of user access events comprises a given user attempting to gain access to one or more computer-related resources is associated with a geohash-encoded string corresponding to the respective geographic region; and in response to a further user access event:
determining a geolocation of the further user access event;
converting the geolocation of the user access event to a geohash-encoded string;
identifying a particular geographic region associated with the determined geolocation by matching the geohash-encoded string of the further user access event to geohash-encoded strings of the plurality of geographic regions;
identifying one or more of the plurality of risk-based policies associated with the particular geographic region; and
processing the user access event based on the identified one or more risk-based policies associated with the particular geographic region.

16. The apparatus of claim 15, wherein the one or more administrators employ the map-based interface to one or more of define the one or more risk-based policies, define one or more alarms for a violation of the one or more risk-based policies and define one or more remediation actions for the violation of the one or more risk-based policies.

17. The apparatus of claim 15, wherein said matching comprises using a prefix-matching technique.

18. The apparatus of claim 15, wherein the map-based interface further comprises a visualization tool to visualize user access data for a plurality of the user access events and the corresponding risk score for each user access event.

19. The apparatus of claim 15, wherein at least one of the geographic regions corresponds to a point of interest of an enterprise organization, and wherein the map-based interface further comprises a tool for configuring the point of interest of the enterprise organization.

20. The apparatus of claim 15, wherein the map-based interface further comprises a tool for filtering access data of the plurality user access events that are included in the computation of the aggregated risk score for one or more of the geographic regions.

* * * * *